United States Patent
Sauler et al.

(10) Patent No.: US 7,010,418 B2
(45) Date of Patent: Mar. 7, 2006

(54) METHOD AND DEVICE FOR BLANKING OUT INTERFERENCE NOISE DURING KNOCK RECORDING IN AN INTERNAL COMBUSTION ENGINE

(75) Inventors: Juergen Sauler, Stuttgart (DE); Michael Baeuerle, Ditzingen-Heimerdingen (DE)

(73) Assignee: Robert Bosch GmbH, Stuttgart (DE)

( * ) Notice: Subject to any disclaimer, the term of this patent is extended or adjusted under 35 U.S.C. 154(b) by 30 days.

(21) Appl. No.: 10/491,807

(22) PCT Filed: Oct. 8, 2002

(86) PCT No.: PCT/DE02/03792

§ 371 (c)(1), (2), (4) Date: Apr. 5, 2004

(87) PCT Pub. No.: WO03/040677

PCT Pub. Date: May 15, 2003

(65) Prior Publication Data

US 2004/0260453 A1   Dec. 23, 2004

(30) Foreign Application Priority Data

Nov. 6, 2001   (DE) ............................... 101 54 422

(51) Int. Cl.
*G06G 7/70* (2006.01)

(52) U.S. Cl. ...................... 701/111; 60/275; 123/192.1; 123/406.16; 123/406.21; 123/405.37; 123/406.39

(58) Field of Classification Search ................ 701/111; 123/406.16, 406.21, 406.29, 406.34, 406.37–406.39, 123/192.1; 60/275
See application file for complete search history.

(56) References Cited

U.S. PATENT DOCUMENTS

| | | | |
|---|---|---|---|
| 5,505,176 A | | 4/1996 | Ishii et al. .................. 123/425 |
| 5,743,233 A | * | 4/1998 | Unland et al. ......... 123/406.37 |
| 6,145,491 A | * | 11/2000 | Wilstermann et al. . 123/406.35 |

FOREIGN PATENT DOCUMENTS

| | | |
|---|---|---|
| EP | 0 281 377 A | 9/1988 |
| FR | 2 449 798 A | 9/1980 |
| GB | 2 154 657 A | 9/1985 |
| WO | 96 00889 A | 1/1996 |

* cited by examiner

*Primary Examiner*—Tony A. Argenbright
*Assistant Examiner*—Johnny H. Hoang
(74) *Attorney, Agent, or Firm*—Michael J. Striker

(57) ABSTRACT

The present invention creates a method and an apparatus for blanking out interfering noise in connection with detecting knocking in an internal combustion engine. The following functions are performed: Forming a sensor signal integral value (KI) during a measurement time slot (MF) of the sensor signal of a knocking sensor; forming a correction value (DKI) for the sensor signal integral value (KI) corresponding to an interfering noise during the measurement time slot (MF); and subtracting the correction value (DKI) from the sensor signal integral value (KI) for forming a corrected sensor signal integral value (KI') with the interfering noise blanked out.

11 Claims, 2 Drawing Sheets

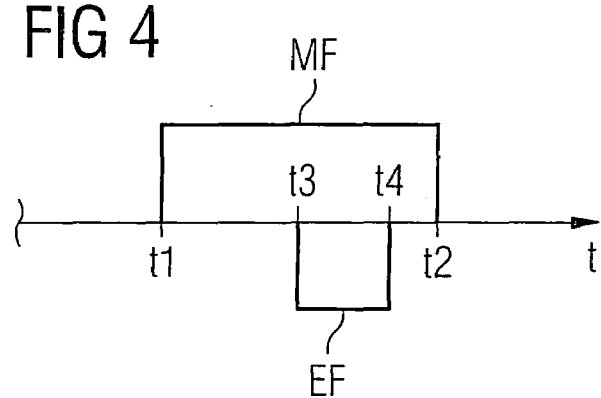
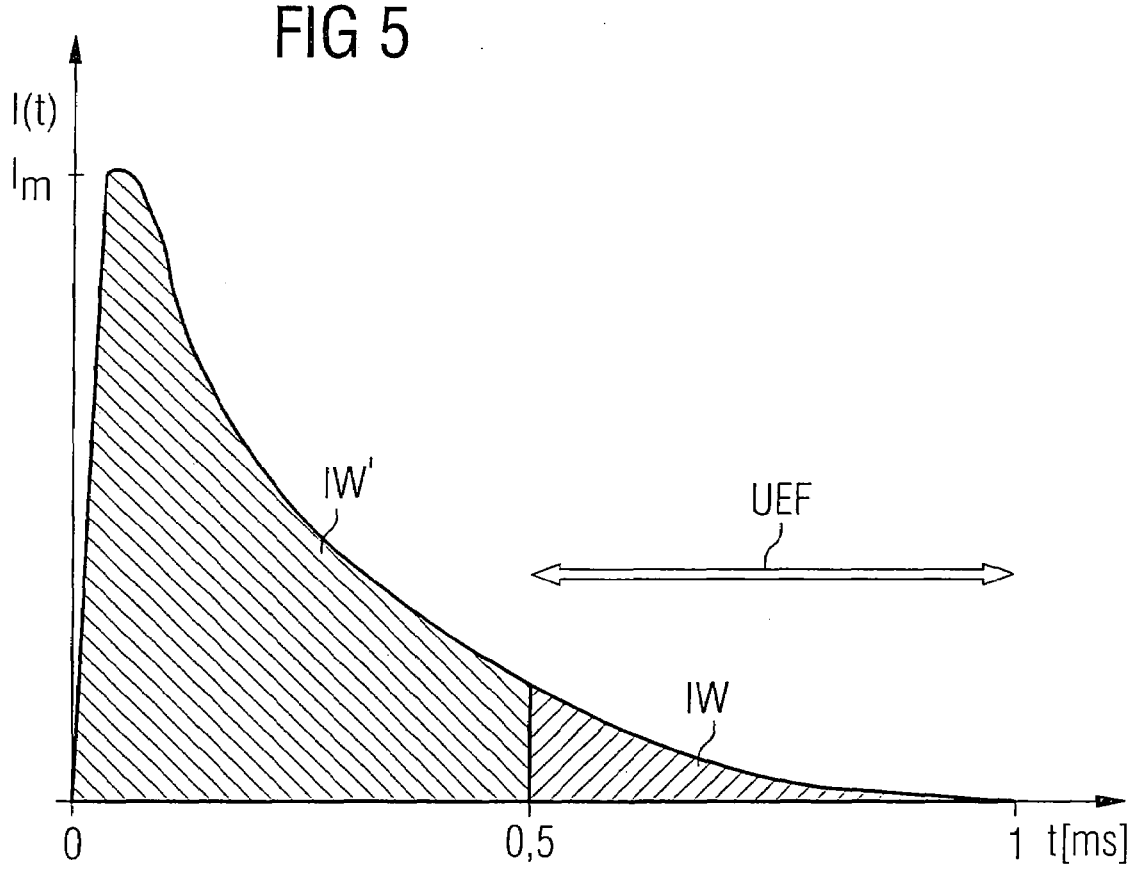

METHOD AND DEVICE FOR BLANKING OUT INTERFERENCE NOISE DURING KNOCK RECORDING IN AN INTERNAL COMBUSTION ENGINE

BACKGROUND OF THE INVENTION

The present invention relates to a method and an apparatus for blanking out interfering noise in connection with detecting knocking in an internal combustion engine.

Knocking is known to cause abnormal interference with combustion in internal combustion engines and causes mechanical pressure waves or high-frequency structure-borne sound, which over long-term operation can cause severe engine damage.

The tendency to knocking can be reduced by various provisions, among others by means of short combustion paths with a central spark plug location, a compact combustion chamber, high turbulence in the combustion chamber, higher-octane fuel, the avoidance of hot spots in the combustion chamber, a lower compression ratio, and a colder mixture intake temperature, and so forth.

Since for good fuel consumption the engine should always be operated near the knocking limit, electronic engine controllers typically have a knocking controller. An important ingredient of this knocking controller is a knocking sensor, which detects the high-frequency oscillations of knocking at the cylinder wall and converts them into electrical oscillations, which are then analyzed for the presence of knocking.

For this purpose, known knocking sensors are connected to a knocking sensor evaluation IC via an input circuit. In the knocking sensor evaluation IC, the high-frequency sensor signal is amplified, filtered, and, during an observation period (measurement time slot), integrated. The outcome of the integrator is read in and processed by a microcontroller and used for knocking detection. From the processed integrator signal, a sliding mean value (reference level) is determined, on the basis of which the occurrence of knocking can be ascertained.

However, knocking sensors detect not only the structure-borne sound originating from combustion but also structure-borne sound interfering noises. For instance, in direct-injection 3- and 6-cylinder engines, overlaps can occur between the measurement time slot for knocking and the onset and end of injection, that is, the actuation in each case of the injection valve.

The noises that the injection valve causes when it opens and closes are transmitted to the engine housing and become perceptible in the structure-borne sound picked up by the knocking sensor.

If these interfering noises migrate into the measurement time slot, they can be erroneously interpreted by the knocking controller as knocking. This leads to unnecessary retardation of the ignition angle and thus an unnecessarily reduced engine torque.

If the opening and closing of the injection valve is always within the measurement time slot for the knocking, this raises the reference level of knocking detection, making the knocking detection poorer. The result of this can be that knocking cannot be detected, resulting in engine damage.

Besides the 3- and 6-cylinder engines already mentioned, the problem of overlapping of the injection and the measurement time slot for the knocking can also occur in future in multiple-injection engines with any other number of cylinders.

FIG. 4, in further detail, illustrates the problems on which the present invention is based, in terms of the course over time of both the knocking control measurement time slot and the interference time slot, the latter being caused for instance by the opening and closing of the injection valve.

In FIG. 4, MF stands for the measurement time slot, EF stands for the interference time slot, t1 through t4 are times, and t is time in general.

In the illustration in FIG. 4, the measurement time slot lasts from a first time t1 to a second time t2. Within this time period, the output signal of the knocking sensor is integrated in a known manner, so as to obtain a sensor signal integral value. Typically, the measurement time slot MF is a few milliseconds long.

The interference time slot EF lasts from time t3 to time t4 and is located entirely inside the measurement time slot MF. The structure-borne sound additionally detected in the interference time slot EF thus adulterates the sensor signal integral value ascertained.

FIG. 5 shows a typical course of intensity over time I(t) of the interference signal inside the interference time slot EF; this signal originates for instance in the opening and closing of the injection valve.

As can be seen from FIG. 5, the interference typically lasts 1 ms, and the course over time initially has a rapid rise to a maximum value $I_m$, followed by an exponential drop to 0. Reference symbols IW and IW' designate the integral values of the course of intensity over time between 0 and 0.5 ms and between 0.5 and 1 ms, respectively. As FIG. 5 clearly shows, the majority of the integral intensity, namely IW', is in the range between 0 and 0.5 ms, that is, at the onset of the opening or closing of the injection valve.

SUMMARY OF THE INVENTION

The method of the invention and the corresponding apparatus have the advantage, over the known solutions to the above problems, that they enable more-accurate knocking detection and control.

The concept on which the present invention is based is that structure-borne sound that originates in an identifiable source of interference, such as an injection valve, is subtracted from the knocking sensor signal integral value, so that now only the structure-borne sound causing by knocking is evaluated.

This provision avoids incorrect detection and hence unnecessary retardation of the ignition angle in the event of migration into the measurement time slot. In steady-state operation, both raising the reference level and thus worsening of knocking detection are avoided.

Advantageous refinements of and improvements to the respective subjects of the invention are disclosed in the dependent claims.

In a preferred refinement, the interfering noise occurs during an interference time slot which is at most as long as the measurement time slot. The forming of the correction value has the following steps: forming a maximum integral interference signal component; detecting an overlapping time slot between the measurement time slot and the interference time slot; and weighting the maximum integral interference signal component with a weighting factor which is formed on the basis of the overlapping time slot.

In a further preferred refinement, for forming the weighting factor, a course of intensity over time of the total interfering noise is furnished, whereby an integral value of the course of intensity over time is put into proportion with the total integral value of the course of intensity over time via the overlapping time slot.

In a further preferred refinement, for forming the maximum integral interference signal component, the following steps are performed: relative chronological provision of the interference time slot and the measurement time slot in such a way that the interference time slot is located entirely within the measurement time slot (MF); forming a first sensor signal integral value; relative chronological provision of the interference time slot and the measurement time slot in such a way that the interference time slot s located entirely outside the measurement time slot; forming a second sensor signal integral value; and subtracting the second sensor signal integral value from the first sensor signal integral value, in order to obtain the maximum integral interference signal component.

In a further preferred refinement, the interfering noise is structure-borne sound that originates in an actuation of an injection valve.

In a further preferred refinement, the forming of the maximum integral interference signal component is performed at operating point at which no knocking control is active.

In a further preferred refinement, the forming of the maximum integral interference signal component is performed again each time the engine is started.

BRIEF DESCRIPTION OF THE DRAWINGS

Exemplary embodiments of the invention are shown in the drawings and described in further detail in the ensuing description.

Shown are:

FIG. 4, the problems on which the present invention is based, illustrated in terms of the course over time of the measurement time slot for the knocking control and the course over time of the interference time slot; and FIG. 5, a typical course of intensity over time I(t) of the interference signal within the interference time slot EF that originates for instance in the opening or closing of the injection valve.

DESCRIPTION OF THE PREFERRED EMBODIMENTS

Figure 1:
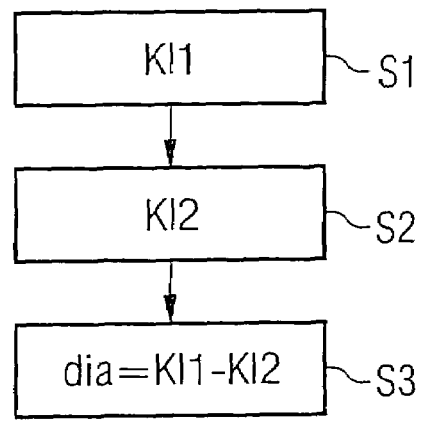
FIG. 1, the essential process steps for ascertaining a maximum integral interference signal contribution in accordance with one embodiment of the present invention.

In the drawings, the same reference numerals stand for the same or functionally identical components.

An embodiment of the invention will now be explained with respect to the actuation (opening or closing) of an injection valve.

FIG. 1 shows the essential process steps for ascertaining a maximum integral interference signal contribution in accordance with one embodiment of the present invention.

In FIG. 1, in a step S1, the forming of a first sensor signal integral value KI1 is effected. For forming this first sensor signal integral value KI1, a chronological overlap of the interference time slot EF and the measurement time slot MF is provided, so that the interference time slot EF is located entirely within the measurement time slot MF. In other words, the first sensor signal integral value KI1 indicates a maximally adulterated sensor signal integral value.

In step S2 of FIG. 1, the forming of a second sensor signal integral value KI2 is effected, once the interference time slot EF and the measurement time slot MF have been placed entirely apart, or in other words no longer have any overlap whatever. The second sensor signal integral value KI2 thus represents the case in which there is no interference in the sensor signal integral value.

In step S3 of FIG. 1, the forming of the maximum integral interference signal contribution dia is effected by subtraction of the second sensor signal integral value KI2 from the first sensor signal integral value KI1. The value dia accordingly represents the integral contribution of the interference to the total signal, when the interference time slot EF is located entirely inside the measurement time slot MF.

Thus the sensor signal integral value ascertained by the knocking sensor evaluation IC must always be corrected downward by the amount of the value dia, if the interference time slot is located entirely within the measurement time slot.

Because of the tolerances of the injection valve and the knocking sensor, the value dia will expediently be ascertained adaptively, for instance once per engine start, in an inactive phase of the knocking control.

Figure 2:
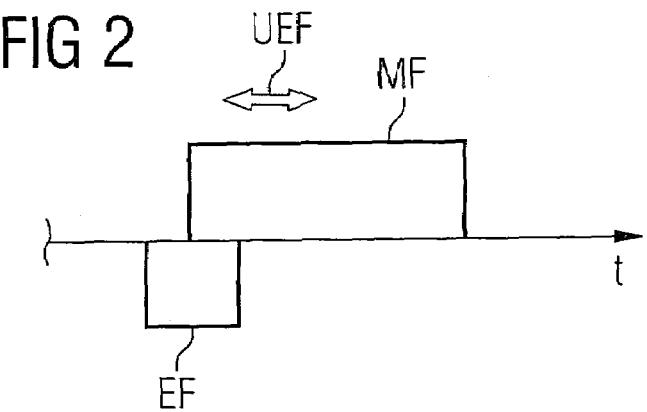
FIG. 2, the situation in which in the blanking out of the interference signal, the interference time slot overlaps only partly with the measurement time slot.

FIG. 2 illustrates the situation in which in the blanking out of the interference signal, the interference time slot EF overlaps only partly with the measurement time slot MF. This duration of overlap is indicated in FIG. 2 by the symbol UEF. With reference to FIG. 5, in the example of FIG. 2 only the second half of the interference signal is located inside the measurement time slot, namely the half that is between 0.5 and 1 ms. Accordingly, only the integral value, marked IW in FIG. 5, of the interference intensity is added to the sensor signal integral value. This kind of only partial overlap of the interference time slot EF with the measurement time slot MF is taken into account in the embodiment of the method of the invention.

In the embodiment of the method of the invention, the maximum interference signal contribution dia calculated in accordance with FIG. 1 is weighted by a weighting factor di, which is formed on the basis of the overlapping time slot UEF and the intensity distribution function I(t). The latter can be predetermined either theoretically or empirically.

For forming this weighting factor di, the integral value IW of the course of intensity over time I(t) is put into proportion with the total integral value IW+IW' of the course of intensity over time I(t) via the overlapping time slot UEF. By multiplying the thus-formed value di by the value dia ascertained in step 3 in FIG. 1, a smaller correction value of the sensor signal integral value is thus obtained for blanking out the interfering noise occurring upon injection, as a function of the size of the overlapping time slot.

Figure 3:
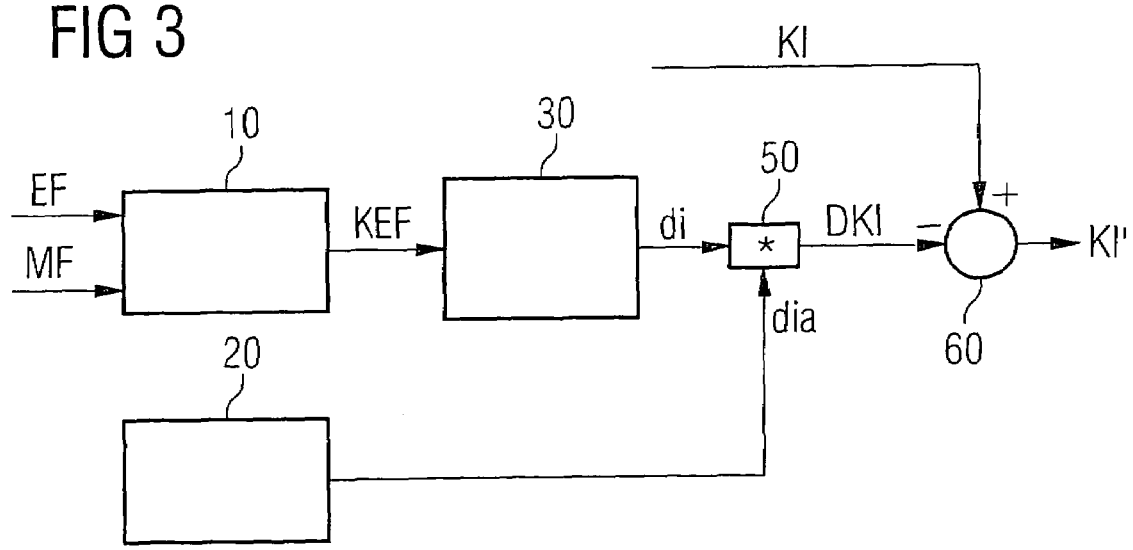
FIG. 3, an embodiment of the apparatus of the invention for blanking out interfering noise in connection with detecting knocking of an internal combustion engine.

FIG. 3 shows an embodiment of the apparatus of the invention for blanking out interfering noise in connection with detecting knocking of an internal combustion engine, for conversion of the method explained with respect to FIGS. 1, 2 and 5.

In FIG. 3, KI stands for an interfering sensor signal integral value originating in a knocking sensor and a knocking sensor evaluation IC; this sensor signal integral value is formed via a measurement time slot MF of the sensor signal of the knocking signal. KI' stands for a corrected sensor signal integral value, which is obtained by subtracting a correction value DKI, corresponding to an interfering noise during the measurement time slot MF, from the sensor signal integral value KI.

The device 10 in FIG. 3 serves to calculate the overlapping time slot UEF of FIG. 2 from the furnished measurement time slot MF and the interference time slot, or injection actuation time slot, EF. The interference time slot can easily be obtained from the engine control data, and the measurement time slot can be obtained from the knocking sensor evaluation IC.

The overlapping time slot UEF is furnished to a device 20, which from it forms the weighting factor di, by putting the integral value IW of the course of intensity over time, within the overlapping time slot, into proportion with the total integral value IW+IW', as illustrated in FIG. 5. This weighting factor di is then fed into a multiplier 50.

The maximum integral interference signal component dia, which is formed by the device 20 in accordance with the description in conjunction with FIG. 1, is also fed into the multiplier 50. In the present embodiment, the forming of this maximum interference signal contribution dia expediently takes place at an operating point at which no knocking control is active, and specifically is performed anew each time the engine is started, in order to provide suitable adaptation with regard to aging and tolerances. By means of multiplying the value dia by the value di in the multiplier 50, finally, the correction value DKI for the sensor signal integral value KI is formed.

In conjunction with the above description of the embodiment, it should be mentioned that the correction must be provided separately for each cylinder, or in other words individually per cylinder. The knocking controller finally uses the corrected sensor signal integral value KI' in order to calculate the reference level and to perform the knocking detection in the usual way.

Although the present invention has been described above in terms of preferred exemplary embodiments, it is not limited to them but instead can be modified in manifold ways.

Although in the present invention an example of an interfering signal that originates in an injection has been given, the invention can be employed for arbitrary interference signals that can be identified chronologically.

Instead of storing the course of intensity over time in memory in the device for forming the weighting factor from the overlapping time slot, it is possible in advance to store in memory a corresponding table or characteristic curve which outputs the weighting factor di directly from the beginning and ending values of the overlapping time slot. Furthermore, still other factors can be utilized for the weighting.

What is claimed is:

1. A method of blanking out interfering noise in connection with detecting knocking in an internal combustion engine, comprising the steps of forming a sensor signal integral value during a measurement time slot of the sensor signal of a knocking sensor; forming a correction value for the sensor signal integral value corresponding to an interfering noise during the measurement time slot; subtracting the correction value from the sensor signal integral value for forming a corrected sensor signal integral value with an interfering noise blanked out, said forming of the correction value including forming a maximal integral interference signal component, detecting an overlapping time slot between the measurement time slot and an interference time slot, and weighting a maximum integral interference signal component with a weighting factor which is formed on a basis of the overlapping time slot.

2. A method as defined in claim 1, wherein said forming the weighting factor includes furnishing a course of intensity over time of a total interfering noise, and putting an integral value of the course of intensity over time into proportion with a total integral value of the course of intensity over time via the overlapping time slot.

3. A method as defined in claim 1, wherein said forming the maximum integral interference signal component includes performing a relative chronological provision of the interference time slot and the measurement time slot in such a way that the interference time slot is located entirely within the measurement time slot, forming a first sensor signal integral value, forming a relative chronological provision of the interference time slot and the measurement time slot in such a way that the interference time slot is located entirely outside the measurement time slot, forming a second sensor signal integral value, and subtracting the second sensor signal integral value from the first sensor signal integral value in order to obtain the maximum integral interference signal component.

4. A method as defined in claim 1; and further representing the interfering noise as structure-borne sound which originates in an actuation of an injection valve.

5. A method as defined in claim 1, wherein the forming of the maximum integral interference signal component includes performing the forming at an operating point at which no knocking control is active or at which it is assured that no knocking occurs.

6. A method as defined in claim 5, wherein the forming of the maximum integral interference signal component includes performing the forming at a low load or a rich mixture.

7. A method as defined in claim 2, wherein the forming of the maximum integral interference signal component includes performing the forming again every time the engine is started.

8. An apparatus for blanking out interfering noise in connection with detecting knocking in an internal combustion engine, comprising a device for forming a sensor signal integral value during a measurement time slot of the sensor signal of a knocking sensor; a device for forming a correction value for the sensor signal integral value corresponding to an interfering noise during the measurement time slot; and a device for subtracting the correction value from the sensor signal integral value for forming a corrected sensor signal integral value with the interfering noise blanked out, said device for forming the correction value including means for forming a maximum integral interference signal component, means for detecting an overlapping time slot between the measurement time slot and an interference time slot, means for forming a weighting factor based on the overlapping time slot, and means for weighting the maximum integral interference signal component by multiplication by the weighting factor.

9. An apparatus as defined in claim 8, wherein said means for forming the weighting factor has stored a course of intensity over time of a total interfering noise in memory and puts an integral value of the course of intensity over time into proportion with a total integral value of the course of intensity over time via the overlapping time slot.

10. An apparatus as defined in claim 8, wherein said means for forming the maximum integral interference signal component is formed so as to perform a relative chronological provision of the interference time slot and the measurement time slot in such a way that the interference time slot is located entirely within the measurement time slot, to form a first sensor signal integral value, to provide a relative chronological provision of the interference time slot and the measurement time slot in such a way that the interference time slot is located entirely outside of the measurement time slot, to form a second sensor signal integral value, and to subtract the second sensor signal integral value from the first sensor signal integral value.

11. An apparatus as defined in claim 8, wherein in the apparatus the interference noise is structure-borne sound which originates in an actuation of an injection valve.

* * * * *